Aug. 24, 1926.

F. B. McCONNELL

LAWN MOWER

Filed April 20, 1925    2 Sheets-Sheet 1

1,597,367

Inventor
F. B. McConnell

By
Attorney

Aug. 24, 1926.
F. B. McCONNELL
1,597,367
LAWN MOWER
Filed April 20, 1925   2 Sheets-Sheet 2
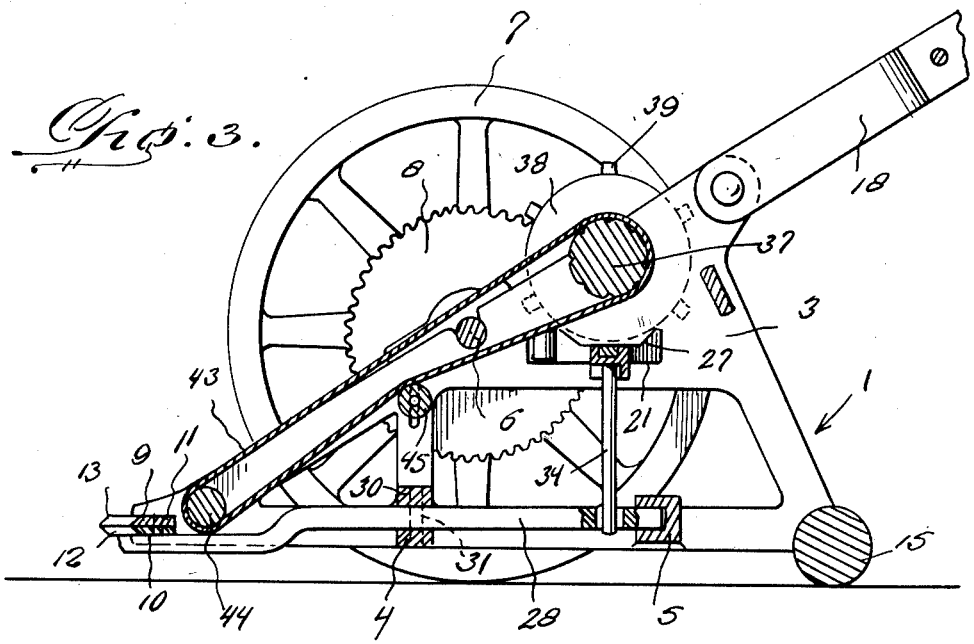
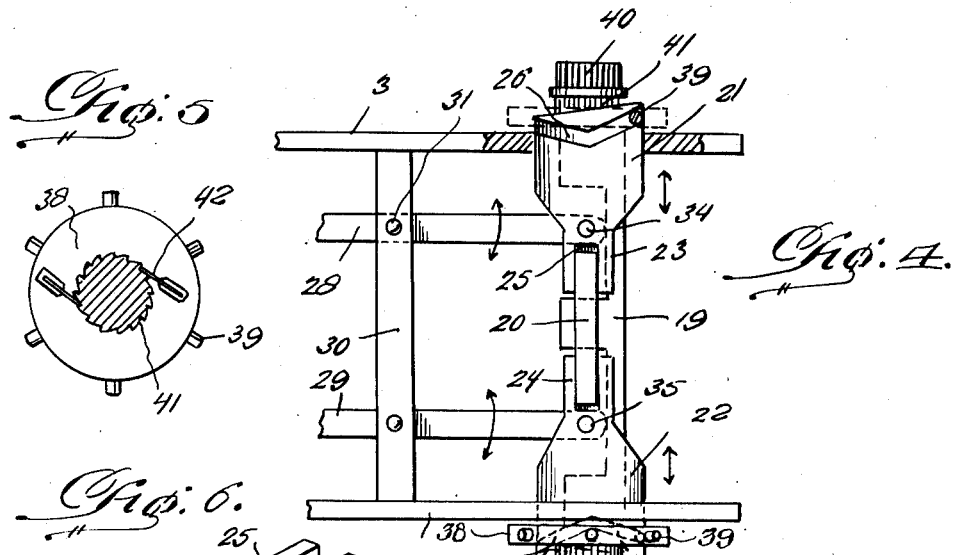
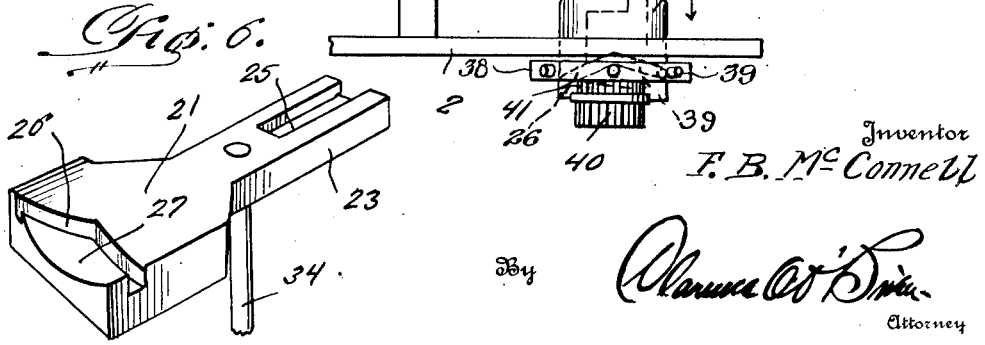
Inventor
F. B. McConnell
By Clarence O'Brien
Attorney Patented Aug. 24, 1926.

1,597,367

UNITED STATES PATENT OFFICE.

FRED B. McCONNELL, OF WORTHINGTON, INDIANA.

LAWN MOWER.

Application filed April 20, 1925. Serial No. 24,491.

This invention relates to improvements in lawn mowers and more particularly to the manually operated type.

One of the important objects of the present invention is to provide a lawn mower which is adapted to cut tall grass as efficiently as short grass.

A further object is to provide a lawn mower of the above mentioned character, wherein means is provided for conveying the cut grass rearwardly with respect to the cutting members, so that the action of the latter will not be impeded.

A still further object is to provide a lawn mower of the above mentioned character, wherein the cutter bars are adapted for reciprocatory movement simultaneonsly in opposite directions, additional means being provided for facilitating the reciprocatory movement of the aforementioned elements as the mower moves forwardly, over the grass.

A further object of the invention is to provide a lawn mower of the above mentioned character, which is simple in construction, inexpensive, strong and durable, and further well adapted for the purpose for which it is designated.

Other objects and advantages of the invention will become apparent during the course of the following detailed description.

In the accompanying drawings, forming a part of this specification, and in which like reference characters indicate corresponding parts throughout the several views:

Figure 3 is a longitudinal sectional view, through the frame and the endless conveyor.

Figure 4 is a fragmentary top plan view of the actuating means for reciprocating the cutter and the guard therefor.

Figure 5 is a detail of one of the toothed wheels illustrating the pawl and ratchet mechanism associated therewith, and Figure 6 is a detail perspective view of one of the slidable members or cams.

Figure 1:
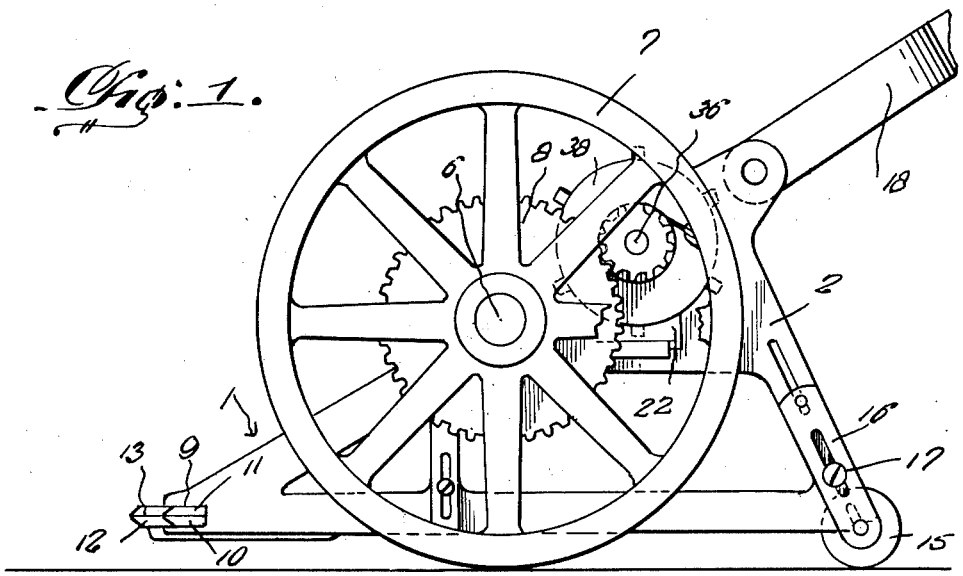
Figure 1 is a side elevation of the lawn mower embodying my invention, the operating handle therefor being broken away.
Figure 2:
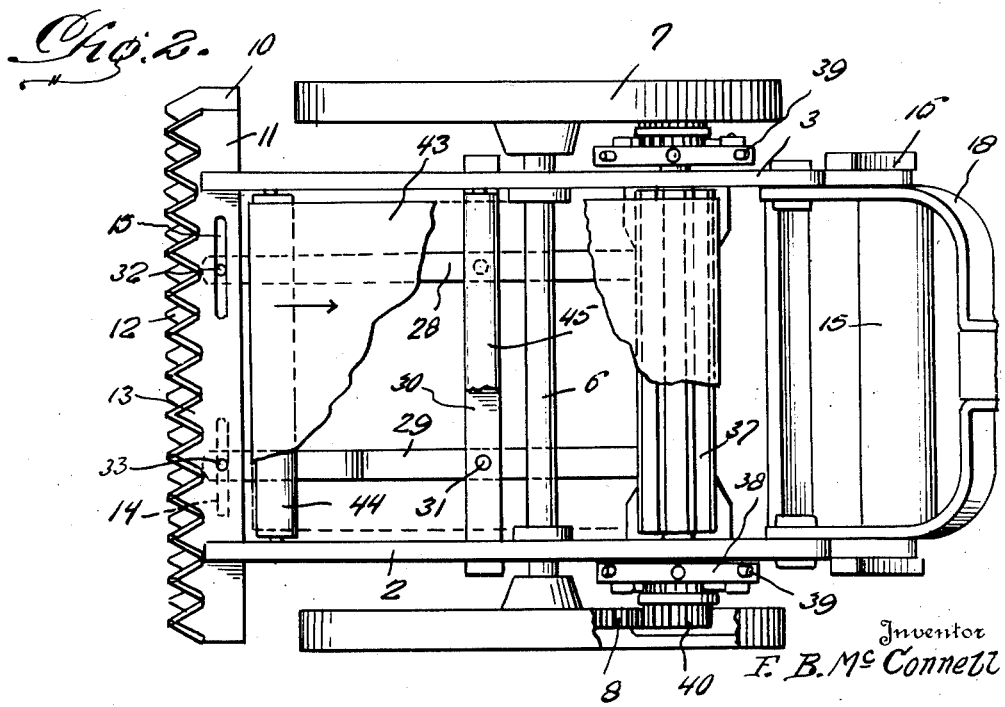
Figure 2 is a top plan view thereof with parts broken away.

In the drawings, wherein for the purpose of illustration is shown the preferred embodiment of my invention, the numeral 1 designates generally the frame of my improved lawn mower, the same including the side portions 2 and 3 respectively. The frame furthermore includes the usual transversely extending bracing means 4 and an additional cross piece 5 extends transversely between the sides of the frame at the rear portion thereof, and the purpose of this cross piece will be hereinafter more fully described. Supported by intermediate portions of the sides 2 and 3 of the frame 1 is a transversely extending axle 6. A pair of traction wheels 7 are supported on the outer ends of the axle in the usual manner. A relatively large gear 8 is supported on the inner face of each of the traction wheels as is clearly illustrated in the drawings and the purpose thereof will be presently apparent. The forward ends of the sides of the frame are provided with aligning cut-out portions 9 and extending transversely across the forward end of the frame and adapted for operation within the aligning cut-out portions are the cooperating cutter bars 10 and 11 respectively. The cutter bar 10 is provided, in its forward longitudinal edge with the substantially triangularly shaped cutting teeth 12, the same being adapted for cooperation with the substantially triangular shaped cutting teeth 13, which extend from the forward longitudinal edge of the cutter bar 11, in the manner as clearly illustrated in Figure 2. As is also illustrated in Figure 2, the cutter bars 10 and 11 are provided with the longitudinal extending slots 14 and 15 respectively, and the purpose thereof will also hereinafter be more fully described.

The usual roller 15 is supported at the rear of the frame, the same being adapted to be adjustably supported by the brackets 16 on the respective sides of the frame, through the means illustrated at 17. By adjusting the roller 15, the height at which the grass cutting means supported at the forward end of the frame is adapted to function may be regulated. It is of course, understood that the frame is pivotally supported on the axle 6.

The usual operating handle, associated with the lawn mower is secured at its lower end to the upwardly inclined rear portion of the frame 1, by means of the yokes 18. A cross bar 19 extends transversely between the upper rear portions of the sides 2 and 3 respectively of the frame 1, the ends of the cross bar extending through a respective side of the frame, as is clearly illustrated in Figure 4. Arranged on the intermediate portion of the cross bar is the longitudinally extending guide strip 20. Adapted for slidable movement on the cross bar 19 and through the respective sides of the frame are the slide members 21 and 22 respectively. The inner opposed ends of the slide members are provided with the shank portions 23 and 24 respectively. Each of said shank portions has formed in the upper face thereof the longitudinally extending groove 25, for cooperation with the respective ends of the guide strip 20, as is clearly illustrated in Figure 4. The outer ends of the slide members are adapted to project outwardly from the respective sides of the frame 1 and formed in the upper face of each of the side members at the outer end thereof is a cam or angular groove 26. It is to be understood, of course, that the upper face of the outer portions of each of the slide members is substantially concave, as illustrated at 27. As is further illustrated, in Figure 4, the ends of the slide members are cut away, so that the same will properly function in carrying out the purposes for which they are designed, and which will be presently described.

A pair of arms 28 and 29 respectively, are pivotally supported intermediate their ends between the bracing member 4 and the superposed cross piece 30, as illustrated at 31. These arms extend longitudinally between the sides of the frame, and are connected at their forward ends to the cutter bars 10 and 11 respectively. An upwardly projecting pin 32 is associated with the forward end of the arm 28, the same extending through an opening provided therefor in the cutter bar 10, and having its upper end operable within the longitudinal slot 15, formed in the adjacent end of the cutter bar 11. In a similar manner, the upwardly projecting pin 33 associated with the forward end of the other arm 29 extends through the longitudinal guide slot 14 provided in the cutter bar 10 and the upper end of this pin extends through an opening provided therefor in the adjacent end of the cutter bar 11. This construction is more clearly illustrated in Figure 2 of the drawings.

The rear ends of the longitudinally extending arms 28 and 29 are disposed in suitable cut-out portions provided therefor in the cross bar 5. A pair of upwardly extending pins 34 and 35 project at their lower ends in the rear ends of the arms 28 and 29 respectively. The upper ends of these pins are secured to the shank portions 23 and 24 of the slide members 21 and 22 respectively, and provides a connection between the slide members and the arms. As is illustrated in Figure 4, the cross bar 19 is cut away to accommodate the upwardly extending pins 34 and 35, and to further permit the reciprocating movement of the pins simultaneous with the reciprocatory movement of the slide members 21 and 22.

A transversely extending shaft 36 has its respective ends extending through the sides of the frame at the upper rear end thereof, the shaft being disposed above the cross bar 19 and the slide members 21 and 22. A corrugated roller 37 is supported on the shaft and is supported between the sides of the frame, and the purpose thereof will hereinafter be more fully described. A toothed wheel 38 is supported on each end of the shaft 36, adjacent the outer face of the sides of the frame, the teeth 39 which project from the perpiphery of the wheel being arranged at spaced intervals. A pinion 40 is supported on each end of the shaft adjacent the outer face of the respective toothed wheels 38. The pinions 40 are adapted to mesh with the respective gears 8, and are supported on the inner faces of the traction wheels 7. Associated with each of the pinions is the ratchet wheel 41, the same being interposed between the pinion and the respective toothed wheel. It is to be understood, however, that each pinion and the respective ratchet wheel are a unitary structure.

The toothed wheels 38 are keyed on the ends of the shaft 36, whereas the pinions with the ratchet wheels associated therewith are loosely supported on the shaft. A pair of pawls such as are shown at 42 are supported on the outer face of each of the toothed wheels and these pawls cooperate with the ratchet wheels 41, in the manner as more clearly illustrated in Figure 5, whereby the pinions may be operatively connected with the toothed wheels so as to insure the actuation of the shaft 36 as the traction wheels 7 move forwardly along the ground. The pawls will furthermore prevent the rotation of the pinions in one direction. The teeth 39 are adapted to cooperate with the annular grooves 26 provided in the upper concaved surfaces of the respective slide members so that the latter will be adapted to reciprocate when the lawn mower is in use.

The operation of my improved lawn mower may be briefly stated as follows:

As the traction wheels 7 move forwardly along the ground, the gears 8 will impart a rotary movement to the shaft 36, through the medium of the pinion 40. The rotation of the shaft 36 and the toothed wheels 38 supported on the outer ends thereof will cause the teeth 39 to operate in the grooves 26 of the slide members in such a manner as to facilitate the reciprocating movement of the slide members back and forth across the upper face of the cross bar 19 in the direction of the arrows. It is also to be understood that the slide members are adapted to move simultaneously in opposite directions, that is, to say that the outer members of the slide members will move in an outward direction. The reciprocating movement of the slide member will impart a similar movement to the cutter bars 10 and 11 respectively, through the medium of the pivoted arms 28 and 29. It is also to be understood that the cutter bars will reciprocate in an opposite direction, so that the cutting teeth 13 will cooperate with the cutting teeth 12, in cutting grass effectively.

In order that the cut grass may be carried rearwardly away from the cutting mechanism, so as not to impede the operation of the latter, I have provided an endless conveyor 43. A conveyor belt is trained over the corrugated roller 37 supported in the upper rear portion of the frame and an additional transversely arranged roller 44 which is located in the forward end of the frame directly in the rear of the guard plate and cutter bar as is clearly illustrated in Figures 2 and 3. This arrangement will enable the cut grass to fall onto the endless conveyor and will be conveyed rearwardly and discharged at the back of the frame, so that when the lawn mower is used in cutting tall grass, the cut grass will in no way interfere with the operation of the cutting mechanism. A transversely extending roller 45 is adapted for vertical adjustment between the sides of the frame, and engages the bottom of the endless conveyor for holding the same in a taut position.

It will thus be seen from the foregoing description, that a lawn mower has been provided, which will, at all times, be positive and efficient in its operation, and will enable tall, as well as short grass to be cut more closely, evenly, and cleanly, than with the use of the lawn mower employing the rotary cutting mechanism.

While I have shown the preferred embodiment of my invention, it is to be understood that various changes in the size, shape, and arrangement of parts may be resorted to, without departing from the spirit of the invention and the scope of the appended claims.

What I claim is:

1. A lawn mower comprising in combination, a wheeled frame, a pair of cooperating cutter bars supported at the forward end thereof, a pair of slide members supported in said frame, the outer end of each slide member extending outwardly of the adjacent side of the frame and provided in its upper face with a cam groove, a toothed wheel supported on the outer face of each side of the frame, the teeth of each wheel adapted to operate in the cam groove in the respective slide members to facilitate the reciprocating movement of the slide members simultaneously, in opposite directions, means for rotating said toothed wheels, and means for operatively connecting the slide members with the respective cutter bars, whereby the latter are adapted for simultaneous reciprocation in opposite directions.

2. A lawn mower comprising in combination, a wheeled frame, a pair of cooperating cutter bars supported at the forward end thereof, a pair of slide members supported in said frame, the outer end of each slide member extending outwardly of the adjacent side of the frame and provided in its upper face with a cam groove, a toothed wheel supported on the outer face of each side of the frame, the teeth of each wheel adapted to operate in the cam groove in the respective slide members to facilitate the reciprocating movement of the slide members simultaneously, in opposite directions, means for rotating said toothed wheels, means for operatively connecting the slide members with the respective cutter bars, whereby the latter are adapted for simultaneous reciprocation in opposite directions, said last mentioned means comprising a pair of pivoted arms, the rear end of one arm being operatively connected with one of said slide members, the forward end of said arm being operatively connected with one of said cutter bars, the other arm being connected at its rear end to the other slide member and at its forward end to the other cutter bar.

3. A lawn mower comprising in combination, a wheeled frame, a pair of cooperating cutter bars supported at the forward end thereof, a pair of slide members supported in said frame, the outer ends of said slide members having cam grooves formed in the upper face thereof, a pair of toothed wheels supported on the sides of the frame, the teeth of said wheels being operable in said cam grooves to facilitate the reciprocation of the slide members simultaneously in opposite directions, means for operatively connecting the slide members with their respective cutter bars, whereby the latter are adapted for simultaneous reciprocation in opposite directions, and means operable by the wheels of the frame for rotating the toothed wheels.

4. A lawn mower comprising in combination a wheeled frame, a pair of cooperating cutter bars supported at the forward end thereof, a pair of slide members supported in said frame, the outer ends of said slide members having cam grooves formed in the upper face thereof, a pair of toothed wheels supported on the sides of the frame, the teeth of said wheels being operable in said cam grooves to facilitate the reciprocation of the slide members simultaneously in opposite directions, means for operatively connecting the slide members with their respective cutter bars, whereby the latter are adapted for simultaneous reciprocation in opposite directions, and means operable by the wheels of the frame for rotating the toothed wheels, said last mentioned means comprising a gear associated with each of the ground engaging wheels, and a pinion associated with each of the toothed wheels, said pinion meshing with said gear.

In testimony whereof I affix my signature.

FRED B. McCONNELL.